(12) United States Patent
Nihey

(10) Patent No.: US 11,583,804 B2
(45) Date of Patent: Feb. 21, 2023

(54) NANOCARBON SEPARATION METHOD, NANOCARBON PURIFICATION METHOD, AND DISPERSION LIQUID

(71) Applicant: NEC Corporation, Tokyo (JP)

(72) Inventor: Fumiyuki Nihey, Tokyo (JP)

(73) Assignee: NEC CORPORATION, Tokyo (JP)

( * ) Notice: Subject to any disclaimer, the term of this patent is extended or adjusted under 35 U.S.C. 154(b) by 827 days.

(21) Appl. No.: 16/486,388

(22) PCT Filed: Feb. 28, 2017

(86) PCT No.: PCT/JP2017/007909
§ 371 (c)(1),
(2) Date: Aug. 15, 2019

(87) PCT Pub. No.: WO2018/158842
PCT Pub. Date: Sep. 7, 2018

(65) Prior Publication Data
US 2020/0108347 A1    Apr. 9, 2020

(51) Int. Cl.
*B01D 57/02*        (2006.01)
*C01B 32/17*        (2017.01)
(Continued)

(52) U.S. Cl.
CPC .............. *B01D 57/02* (2013.01); *C01B 32/17* (2017.08); *B82Y 30/00* (2013.01); *B82Y 40/00* (2013.01)

(58) Field of Classification Search
CPC ..... B01D 57/02; C01B 32/17; C01B 2202/02; C01B 32/15; C01B 32/172; C01B 32/158; C01B 32/159; C01B 32/16; C01B 32/162; C01B 32/164; C01B 32/166; C01B 32/168; C01B 32/174; C01B 32/176; C01B 32/178; C01B 2202/00; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32;
(Continued)

(56) References Cited

U.S. PATENT DOCUMENTS 7,867,468 B1 * 1/2011 Haddon ................ B82Y 40/00
                                                   977/720
2012/0103809 A1   5/2012  Ihara et al.

FOREIGN PATENT DOCUMENTS

JP    2005-527455 A    9/2005
JP    2008-055375 A    3/2008
(Continued)

OTHER PUBLICATIONS

Machine Translation of WO 2011/102322 to Ihara, et al. (Year: 2011).*

(Continued)

*Primary Examiner* — Daniel C. McCracken
(74) *Attorney, Agent, or Firm* — Sughrue Mion, PLLC

(57) ABSTRACT

A nanocarbon separation method includes a step of preparing a dispersion liquid having nanocarbons dispersed therein; a step of injecting a liquid including the dispersion liquid into an electrophoresis tank so that a pH of the liquid increases from a bottom to a top in a direction of gravitational force; and a step of applying a direct current to electrodes disposed in an upper part and a lower part of the electrophoresis tank.

11 Claims, 8 Drawing Sheets

(51) Int. Cl.
*B82Y 30/00* (2011.01)
*B82Y 40/00* (2011.01)

(58) Field of Classification Search
CPC . C01B 2202/34; C01B 2202/36; B82Y 30/00; B82Y 40/00; B03C 5/00; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

FOREIGN PATENT DOCUMENTS

| | | |
|---|---|---|
| JP | 2008-266112 A | 11/2008 |
| JP | 2008-285386 A | 11/2008 |
| WO | 2006/013788 A1 | 2/2006 |
| WO | 2008/143281 A1 | 11/2008 |
| WO | 2010/150808 A1 | 12/2010 |
| WO | 2011/102322 A1 | 8/2011 |
| WO | WO 2011/102322 * 8/2011 ............. C01B 31/02 |

OTHER PUBLICATIONS

International Search Report of PCT/JP2017/007909 dated Apr. 11, 2017.

* cited by examiner

NANOCARBON SEPARATION METHOD, NANOCARBON PURIFICATION METHOD, AND DISPERSION LIQUID

CROSS REFERENCE TO RELATED APPLICATIONS

This application is a National Stage of International Application No. PCT/JP2017/007909 filed Feb. 28, 2017.

TECHNICAL FIELD

The present invention relates to a nanocarbon separation method, a nanocarbon purification method, and a dispersion liquid.

BACKGROUND ART

In recent years, it has been expected that carbon materials having a size in a nanometer range (hereinafter referred to as "nanocarbons") will be applied to various fields due to their mechanical properties, electrical properties, chemical properties, and the like.

In the case of nanocarbons, nanocarbons having different properties are simultaneously produced in a manufacturing stage in some cases. When nanocarbons having different electrical properties are used in an electronic material when mixed together, a problem such as the deterioration in the characteristics thereof is likely to be caused. Thus, it is necessary to separate nanocarbons having different properties.

In order to separate nanocarbons, Patent Document 1 describes a nanocarbon material separation method which includes: a step of introducing a dispersion solution including nanocarbon materials dispersed in nanocarbon micelle groups having a plurality of different charges and a holding solution having a specific gravity different from that of the nanocarbon materials into an electrophoresis tank by laminating the solutions by disposing them in a predetermined direction; and a step of separating the nanocarbon micelle groups into two or more nanocarbon micelle groups by applying electricity in a serial direction to the introduced, arranged, and laminated dispersion solution and holding solution.

PRIOR ART DOCUMENTS

Patent Documents

[Patent Document 1] PCT International Publication No. WO2010/150808

SUMMARY OF THE INVENTION

Problem to be Solved by the Invention

However, the nanocarbon separation method described in Patent Document 1 has a problem in the efficiency of separation. That is to say, in the nanocarbon separation method described in Patent Document 1, some time is taken to perform the separation.

An object of the present invention is to provide a nanocarbon separation method, a purification method, and a dispersion liquid in which the separation efficiency can improved or the time required for separation can be shortened when nanocarbons having different properties are separated.

Means for Solving the Problem

A nanocarbon separation method of the present invention includes a step of preparing a dispersion liquid having nanocarbons dispersed therein; a step of injecting a liquid including the dispersion liquid into an electrophoresis tank so that a pH of the liquid increases from a bottom to a top in a direction of gravitational force; and a step of applying a direct current to electrodes disposed in an upper part and a lower part of the electrophoresis tank.

A nanocarbon separation method of the present invention includes a step of injecting a dispersion liquid having nanocarbons dispersed therein into an electrophoresis tank; a step of injecting a liquid having a pH higher than a pH of the dispersion liquid into the electrophoresis tank after injecting the dispersion liquid; and a step of applying a direct current to electrodes disposed in an upper part and a lower part of the electrophoresis tank.

A nanocarbon purification method of the present invention includes a step of preparing a dispersion liquid having carbon nanotubes dispersed therein; a step of injecting a liquid including the dispersion liquid into an electrophoresis tank so that a pH of the liquid increases from a bottom to a top in a direction of gravitational force; a step of applying a direct current to electrodes disposed in an upper part and a lower part of the electrophoresis tank and separating the carbon nanotubes into metallic nanotubes and semiconducting nanotubes; and a step of recovering the separated semiconducting nanotubes.

A dispersion liquid of the present invention is a dispersion liquid which includes a dispersion medium and carbon nanotubes, wherein 90% or more of the carbon nanotubes are semiconducting carbon nanotubes.

Effect of the Invention

According to the present invention, when nanocarbons having different properties are separated, the separation efficiency can be improved. Alternatively, according to the present invention, a time required for the separation can be shortened when carbon nanohorns having different properties are separated.

EMBODIMENTS FOR CARRYING OUT THE INVENTION

Figure 1:
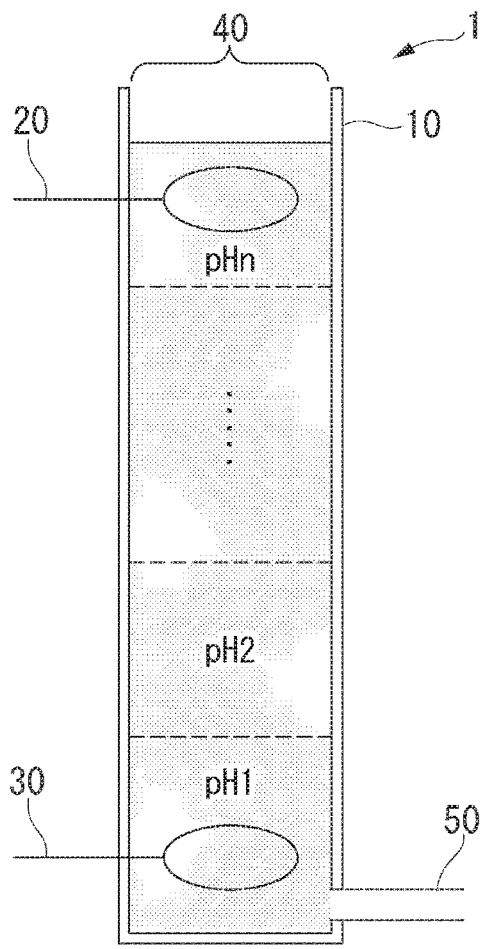
FIG. 1 is a schematic diagram showing an example of a separation apparatus according to an embodiment.

A nanocarbon separation method, a nanocarbon purification method, and a dispersion liquid according to an embodiment will be described below with reference to the drawings. In the embodiment, nanocarbon materials refer to carbon materials mainly composed of carbon including single-walled carbon nanotubes, double-walled carbon nanotubes, multi-walled carbon nanotubes, carbon nanohorns, carbon nanotwists, graphene, fullerene, and the like. As an example regarding nanocarbons, the case of separating single-walled carbon nanotubes of a semiconducting type and single-walled carbon nanotubes of a metallic type from a dispersion liquid containing single-walled carbon nanotubes will be described in detail.

(1) Single-Walled Carbon Nanotubes

It is known that single-walled carbon nanotubes can be divided into two different types, i.e., those having metallic properties and those having semiconducting properties in accordance with a diameter and a winding manner of tubes. When single-walled carbon nanotubes are synthesized using currently known manufacturing methods, mixed materials including single-walled carbon nanotubes which include single-walled carbon nanotubes having metallic properties (hereinafter referred to as "metallic single-walled carbon nanotubes") and single-walled carbon nanotubes having semiconducting properties (hereinafter referred to as "semiconducting single-walled carbon nanotubes") in a statistical ratio of 1:2 are obtained.

It should be noted that, in the following description, single-walled carbon nanotubes in which metallic single-walled carbon nanotubes and semiconducting single-walled carbon nanotubes are mixed together are referred to as a single-walled carbon nanotube mixture. The single-walled carbon nanotube mixture is not particularly limited as long as the single-walled carbon nanotube mixture contains metallic single-walled carbon nanotubes and semiconducting single-walled carbon nanotubes. Furthermore, single-walled carbon nanotubes in the embodiment may be independently single-walled carbon nanotubes or may be single-walled carbon nanotubes in which some of carbon atoms are substituted with arbitrary functional groups, or single-walled carbon nanotubes in which some of carbon atoms are modified by arbitrary functional groups.

An example in which a dispersion liquid in which a single-walled carbon nanotube mixture is dispersed in a dispersion medium is separated into single-walled carbon nanotubes of a semiconducting type and single-walled carbon nanotubes of a metallic type will be described in detail below.

(2) Dispersion Liquid of Single-Walled Carbon Nanotube Mixture

A dispersion liquid of a single-walled carbon nanotube mixture in the embodiment is a liquid in which a single-walled carbon nanotube mixture is dispersed in a dispersion medium. It is desirable to use water or heavy water as the dispersion medium for the dispersion liquid. However, a dispersion medium such as an organic solvent and an ionic liquid may be used as long as the dispersion medium is a dispersion medium which can disperse single-walled carbon nanotubes. As an auxiliary material used for dispersing a single-walled carbon nanotube mixture in a dispersion medium, a non-ionic surfactant, a cationic surfactant, an anionic surfactant, another dispersion auxiliary agent, and the like may be used. Particularly, it is desirable to use a non-ionic surfactant. The non-ionic surfactant will be described later. A method of preparing the dispersion liquid will also be described later.

A separation apparatus used in the embodiment will be described below.

FIG. 1 shows a separation apparatus in the embodiment. This separation apparatus includes an electrophoresis tank 10 having an I-shaped structure, an electrode 20 disposed in an upper part in the electrophoresis tank 10, an electrode 30 disposed in a lower part in the electrophoresis tank 10, an injection port 40 through which a liquid is injected into the electrophoresis tank 10, and a recovery port 50 through which a liquid is recovered from the electrophoresis tank 10.

The electrophoresis tank 10 has a space having a liquid accommodated therein. A dispersion liquid of a single-walled carbon nanotube mixture to be separated is injected into the electrophoresis tank 10 and a carbon nanotube mixture is separated. Any material may be adopted for the electrophoresis tank 10 as long as the material is an insulating material. For example, glass, quartz, acrylic resin, and the like can be used as the material of the electrophoresis tank 10.

When a voltage is applied to the electrode 20 and the electrode 30, the single-walled carbon nanotube mixture is separated into metallic single-walled carbon nanotubes and semiconducting carbon nanotubes. The metallic single-walled carbon nanotubes collect near a negative electrode. On the other hand, the semiconducting single-walled carbon nanotubes collect near a positive electrode. For this reason, it is desirable to dispose the electrode 20 and the electrode 30 at an upper end portion and a lower end portion of the electrophoresis tank 10. It is more desirable to dispose a positive electrode in a lower part of the electrophoresis tank 10 and to dispose a negative electrode in an upper part of the electrophoresis tank 10. When the electrode 30 is used as the positive electrode and the electrode 20 is used as the negative electrode, an electric field Z is directed upward from the bottom of the electrophoresis tank 10. On the other hand, when the electrode 30 disposed in the lower part of the electrophoresis tank 10 is used as the negative electrode and the electrode 20 disposed in the upper part of the electrophoresis tank 10 is used as the positive electrode, the electric field Z is directed downward from the top of the electrophoresis tank 10.

Here, in the case of the upward direction and the downward direction, a direction upward in a direction of gravitational force indicates the upward direction and a direction downward in the direction of gravitational force indicates the downward direction when a separation apparatus 1 is installed in a usable state. Platinum or the like can be used as a material of the electrodes 20 and 30.

The injection port 40 is an opening through which a liquid is injected into the electrophoresis tank 10. The injection port 40 in the embodiment is an opening provided in an upper end of the electrophoresis tank 10.

The recovery port 50 is an opening through which a liquid is recovered from the electrophoresis tank 10. The recovery port 50 may be provided at a lower end of the electrophoresis tank 10. When a plurality of recovery ports 50 are provided, it is desirable to provide the recovery ports near the electrodes 20 and 30. Since the separated metallic single-walled carbon nanotubes move to the vicinity of the negative electrode and the semiconducting single-walled carbon nanotubes move to the vicinity of the positive electrode, the moved single-walled carbon nanotubes can be efficiently recovered.

Although a constitution in which the injection port 40 and the recovery ports 50 are provided has been shown in the example shown in FIG. 1, the constitution of the separation apparatus 1 is not limited thereto. For example, the injection port 40 may also be used as one of the recovery ports 50.

Figure 2:
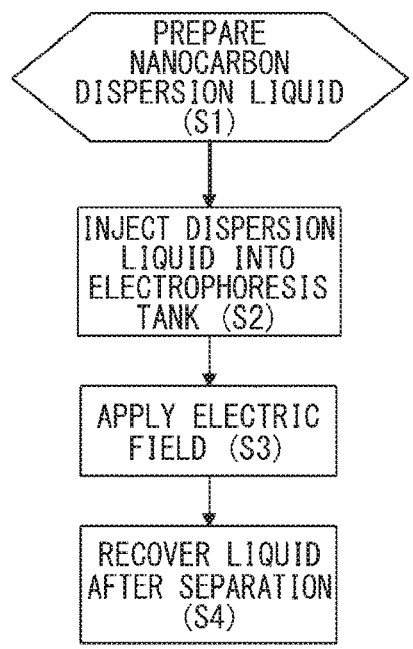
FIG. 2 is a flowchart showing a nanocarbon separation method according to the embodiment.

The nanocarbon separation method according to the embodiment will be described below. FIG. 2 is a flowchart showing the nanocarbon separation method in the embodiment.

First, in a first step (S1), a plurality of liquids having different pHs are prepared. At least one of the plurality of liquids is a dispersion liquid of a single-walled carbon nanotube mixture. The plurality of liquids having different pHs are liquids in which a predetermined solute is contained in a predetermined solvent. As the predetermined solute, for example, a surfactant can be used. Furthermore, as the predetermined solvent, water and heavy water can be used. By adjusting the concentration of a surfactant that is a solute, a pH can be adjusted. For example, heavy water can be used as a solvent and polyoxyethylene (100) stearyl ether (Brij 700 [trade name]) that is a surfactant which is a non-ionic surfactant can be used as a solute. In this case, a 1 wt % aqueous solution of Brij 700 at room temperature (25° C.) has a pH lower than that of a 0.5 wt % aqueous solution of Brij 700.

Next, a method of acquiring a dispersion liquid of a single-walled carbon nanotube mixture is not particularly limited and known methods can be applied as the method. For example, when a single-walled carbon nanotube mixture and a dispersion medium are mixed and subjected to ultrasonic treatment, the single-walled carbon nanotube mixture is dispersed in the dispersion medium. Alternatively, single-walled carbon nanotubes may be dispersed in the dispersion medium using a mechanical shear force. The dispersion liquid may contain a dispersion auxiliary agent such as a surfactant in addition to the single-walled carbon nanotube mixture and the dispersion medium.

Subsequently, in a second step (S2), the liquids prepared in the first step are injected into the electrophoresis tank 10 so that the pHs of the liquids increase from the bottom to the top thereof in a direction of gravitational force irrespective of whether or not the liquids contain single-walled carbon nanotubes. To be specific, a liquid having a lowest pH among the prepared liquids is put into the electrophoresis tank 10. Subsequently, a liquid having a second higher pH among the prepared liquids is put into the electrophoresis tank 10. After that, the other liquids are put into the electrophoresis tank 10 in order from a liquid having a lowest pH. This makes it possible to form a pH gradient in which the pHs of the liquids increase from the bottom to the top thereof in the direction of gravitational force in the electrophoresis tank.

In a third step (S3), a direct current (DC) voltage is applied to the electrophoresis tank. Metallic single-walled carbon nanotubes in the carbon nanotube mixture dispersed in the liquid move to the vicinity of the negative electrode and semiconducting single-walled carbon nanotubes move toward the positive electrode side. As a result, the carbon nanotube mixture dispersed in each of the liquids can be separated into a metallic type and a semiconducting type. In the case of using a liquid having a non-ionic surfactant dissolved therein, metallic single-walled carbon nanotubes have a positive charge in the liquid and semiconducting single-walled carbon nanotubes have a very weak negative charge. Furthermore, after voltage application, the semiconducting single-walled carbon nanotubes tend to have a pH higher than that of the metallic single-walled carbon nanotubes. The single-walled carbon nanotube mixture is separated into a metallic type and a semiconducting type due to a combined force of a moving force generated due to a difference between the pHs and an electrophoretic force generated due to an electric field and charges.

In the case of a voltage to be applied, an optimal value thereof needs to be determined using a composition of the dispersion medium and an amount of charge of the single-walled carbon nanotube mixture. When water, heavy water, or the like is used as the dispersion medium, an application voltage applied between electrodes which are farthest away from each other can be an arbitrary value between greater than 0 V and 1000 V or less (0 to 1000 V). Particularly, since water and heavy water minimize the effects of electrolysis, it is desirable to apply a voltage in a range of greater than 0 V and 120 V or less (0 to 120 V).

Finally, in a fourth step (S4), the separated liquid is recovered. The separated liquid is recovered through the recovery ports 50 in a state in which a voltage is applied. It should be noted that any methods may be used for the recovery as long as samples do not diffuse and become mixed. For example, a method of stopping applying a voltage and gently suctioning the separated liquid using a pipette every 1 mL and a method of inserting partitioning plates into a separation flow path and recovering a liquid in each block may be used.

Thus, the single-walled carbon nanotube mixture can be separated into the metallic single-walled carbon nanotubes and the semiconducting single-walled carbon nanotubes. It should be noted that the first to fourth steps may be repeatedly performed using the recovered liquid obtained in the fourth step. By repeatedly performing the first to fourth steps, the purity of the metallic single-walled carbon nanotubes and the semiconducting single-walled carbon nanotubes can be improved.

It should be noted that, although an example in which the single-walled carbon nanotube mixture is separated into the metallic single-walled carbon nanotubes and the semiconducting single-walled carbon nanotubes has been described in the foregoing description, the present invention is not limited thereto. For example, this may be performed as a purification method of single-walled carbon nanotubes in which only single-walled carbon nanotubes having desired properties are recovered after separation is performed in the electrophoresis tank 10.

The separation efficiency of the recovered sample can be evaluated using a method such as a microscopic Raman spectroscopic analysis (a change in Raman spectrum in a radial breathing mode (RBM) region and a change in Raman spectrum shape in a BWF region), ultraviolet visible near-infrared absorption spectrophotometry (a change in peak shape of an absorption spectrum), and the like. Furthermore, it is also possible to evaluate the separation efficiency by evaluating the electrical properties of the single-walled carbon nanotubes. For example, it is possible to evaluate a sample by preparing a field effect transistor and measuring the transistor characteristics thereof.

In the above description, an example of using polyoxyethylene (100) stearyl ether (Brij 700 [trade name]) as a non-ionic surfactant has been described. However, the non-ionic surfactant is not limited thereto.

As a non-ionic surfactant, it is possible to use one non-ionic surfactant including a non-ionizing hydrophilic site and a hydrophobic site such as an alkyl chain or a combination of a plurality of non-ionic surfactants each of which includes a non-ionizing hydrophilic site and a hydrophobic site such as an alkyl chain. For example, a non-ionic surfactant having a polyethylene glycol structure represented by a polyoxyethylene alkyl ether type, an alkyl glucoside type non-ionic surfactant, and the like can be used. Furthermore, it is desirable to use non-ionic surfactants defined by polyoxyethylene (n) alkyl ether (n is 20 or more and 100 or less; and in which an alkyl chain length is C12 or more and C18 or less). For example, polyoxyethylene (23) lauryl ether (Brij 35 [trade name]), polyoxyethylene (20) cetyl ether (Brij 58 [trade name]), polyoxyethylene (20) stearyl ether (Brij 78 [trade name]), polyoxyethylene (10) oleyl ether (Brij 97 [trade name]), polyoxyethylene (10) cetyl ether (Brij 56 [trade name]), polyoxyethylene (10) stearyl ether (Brij 76 [trade name]), polyoxyethylene (20) oleyl ether (Brij 98 [trade name]), polyoxyethylene (100) stearyl ether (Brij 700 [trade name]), and the like can be used.

Figure 3:
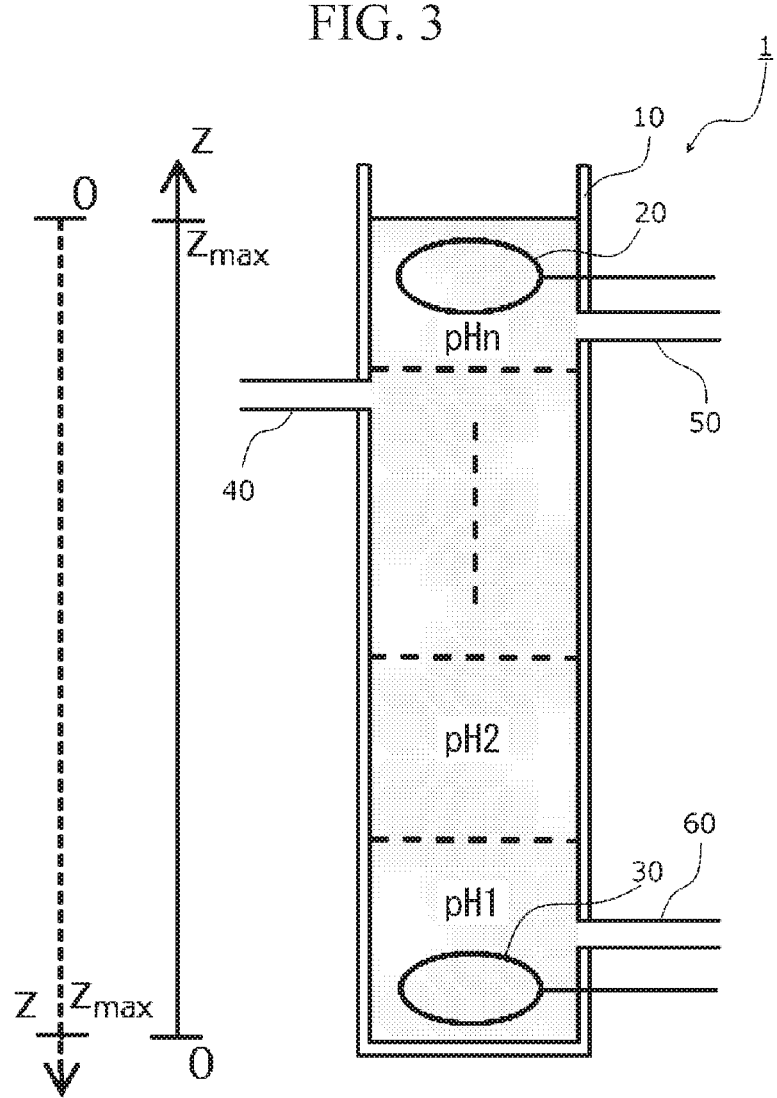
FIG. 3 is a schematic diagram showing a modified example of the separation apparatus according to the embodiment.
Figure 4:
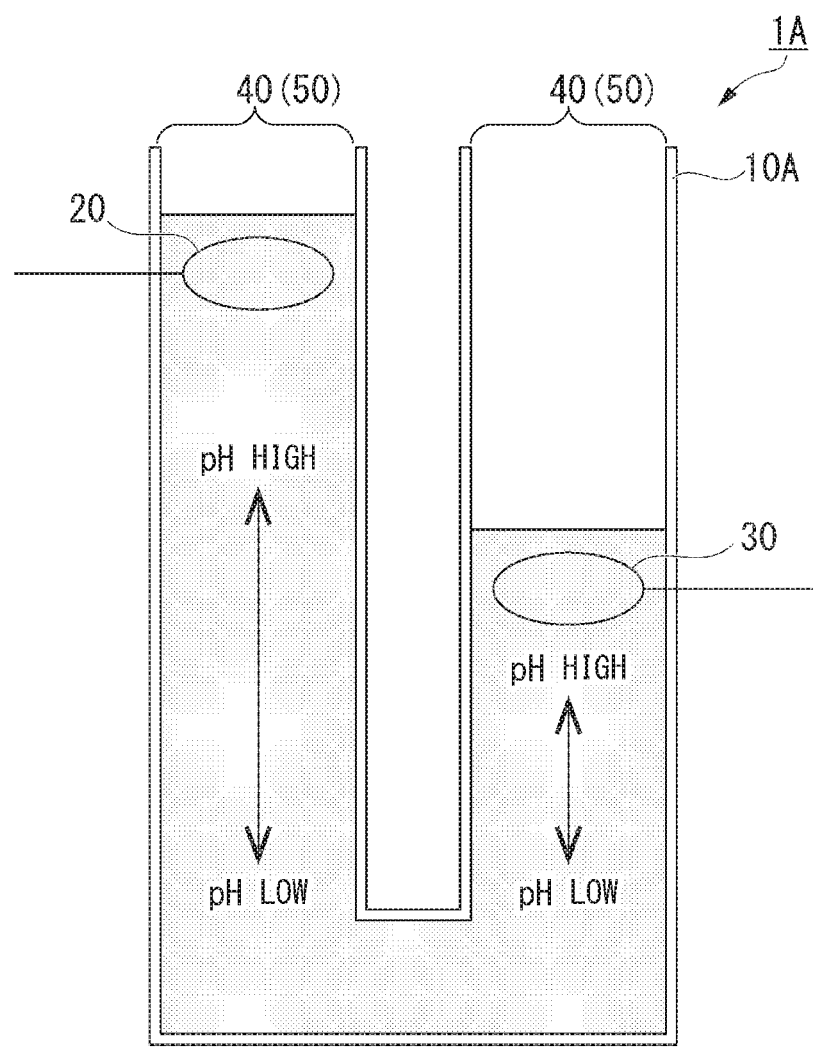
FIG. 4 is a schematic diagram showing another modified example of the separation apparatus according to the embodiment.

FIGS. 3 and 4 show modified examples of the separation apparatus 1.

A separation apparatus 1A shown in FIG. 3 includes an electrophoresis tank 10 having an I-shaped structure, an electrode 20 disposed in an upper part in the electrophoresis tank 10, an electrode 30 disposed in a lower part in the electrophoresis tank 10, an injection port 40, a recovery port 50 provided near the electrode 20, and a recovery port 60 provided near the electrode 30. The recovery port 40 is provided above halfway in a height direction of the electrophoresis tank 10 and below the recovery port 50.

A separation apparatus 1B shown in FIG. 4 has a U-shaped structure. An electrophoresis tank 10A of a separation apparatus 1C is an electrophoresis tank 10A having a U-shaped structure of which the two ends open upward. Openings of both ends of the electrophoresis tank 10A serve as an injection port 40 and a recovery port 50. An electrode 20 is provided on one side of the two U-shaped ends and an electrode 30 is provided on the other side end. It should be noted that it is desirable that a height position of one electrode be higher than a height position of the other electrode. It is more desirable that the positive electrode be disposed lower than the negative electrode.

Although an embodiment applicable to separation of metallic type and semiconducting type single-walled carbon nanotubes has been described above, the present invention can also be applied to other nanocarbons, that is, multi-walled carbon nanotubes, double-walled carbon nanotubes, graphene, and the like.

By using the nanocarbon separation method according to the embodiment, the separation efficiency can be improved when nanocarbons having different properties are separated.

Also, by using the nanocarbon separation method according to the embodiment, the dispersion liquid becomes stabilized in the electrophoresis tank. As a result, it is possible to enhance the purity of the separated nanocarbons.

Embodiments will be described below. The following embodiments are examples and the present invention is not limited to the following embodiments.

Embodiment 1

Figure 5:
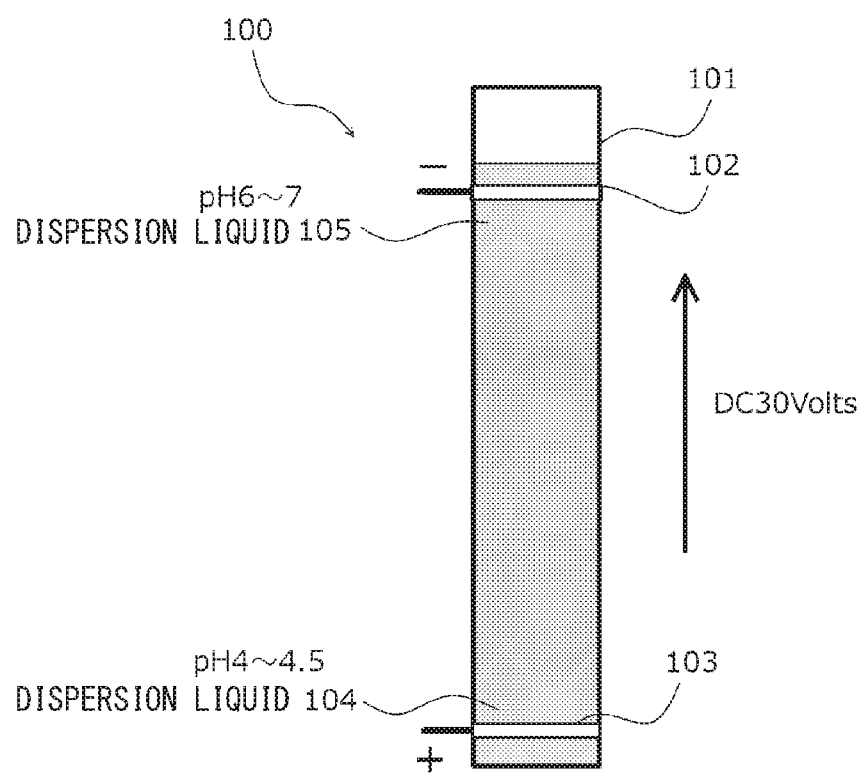
FIG. 5 is a schematic diagram showing an example of electrophoresis conditions according to the embodiment.

FIG. 5 is a schematic diagram showing an example of electrophoresis conditions shown in the embodiment. Description will be provided below with reference to FIG. 5.

(1) Preparation of Liquid for Separation

As a dispersion medium, an aqueous solution in which 0.25 wt % of Brij 700 that was a non-ionic surfactant was dissolved in water was prepared. A single-walled carbon nanotube mixture (eDIPS single-walled carbon nanotube) was mono-dispersed in this dispersion medium. The mono-dispersed liquid was subjected to ultrasonic dispersion treatment using a horn type ultrasonic crusher (output: about 300 W; over 30 minutes). After that, the mono-dispersed liquid was subjected to a ultracentrifugation operation and a supernatant that was 50% of the mono-dispersed liquid was obtained as a dispersion liquid (hereinafter referred to as a "CNT dispersion liquid").

Also, an aqueous solution in which 2 wt % of Brij 700 that was a non-ionic surfactant was dissolved in water (hereinafter referred to as a "2 wt % Brij aqueous solution") and water were prepared.

In the case of the pHs of the liquids, the 2 wt % Brij aqueous solution was the lowest (pH 4 to 4.5) and the CNT dispersion liquid was pH 6 to 7.

(2) Injection of Liquid

The prepared liquids were injected into an electrophoresis tank 101 of a separation apparatus 100 shown in FIG. 5. First, the 2 wt % Brij aqueous solution was put into the electrophoresis tank 101. A 2 wt % Brij layer 104 was formed using the put-in 2 wt % Brij aqueous solution. Subsequently, the CNT dispersion liquid was gently injected into the electrophoresis tank 101 of the separation apparatus 100 so that a CNT dispersion liquid 105 layer was laminated above the 2 wt % Brij layer 104. As described above, the pH gradient increasing from the bottom to the top thereof in a direction of gravitational force was formed in a liquid in the electrophoresis tank 101.

(3) Separation Operation

A DC voltage (30 V) was applied between a lower electrode 103 (a positive electrode) and an upper electrode 102 (a negative electrode) of the separation apparatus 100.

Figure 6:
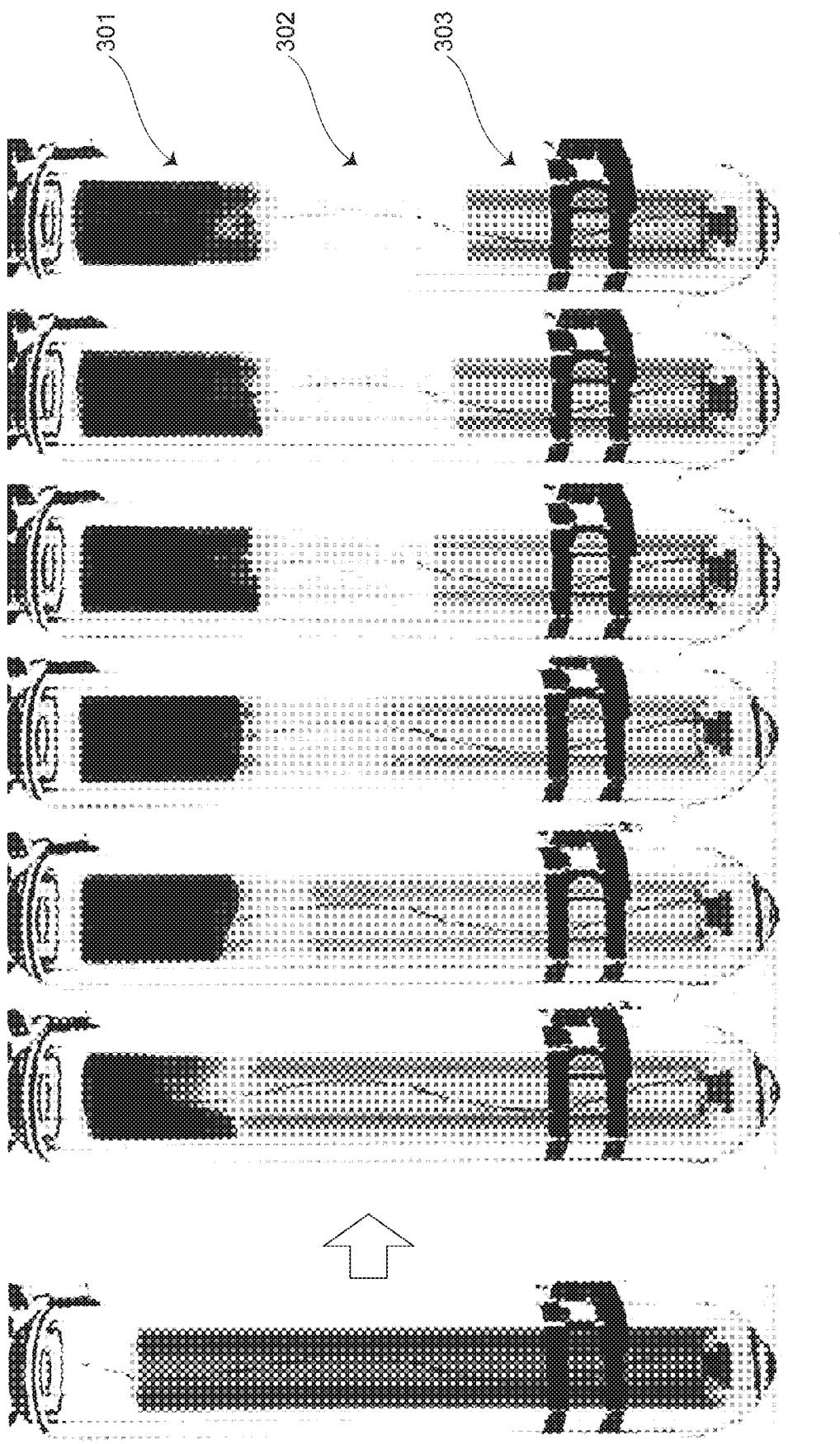
FIG. 6 is a photograph showing a sample movement state before and after electrophoresis according to the embodiment.

After the voltage application was completed, formation of layers in the electrophoresis tank 101 was confirmed. FIG. 6 shows a photograph of the electrophoresis tank 101 before and after the separation operation. A final state (a rightmost photograph) was a state in which three layers, i.e., a region (301) containing a large amount of metallic single-walled carbon nanotubes, a transparent region (302), and a region (303) containing a large amount of semiconducting single-walled carbon nanotubes were formed.

After the voltage application was completed, the liquid was recovered from an upper part of the electrophoresis tank 101 so that 15 fractions were obtained per about 1 mL. Fractions were #1, #2, . . . , and #15 from the positive electrode side (a lower part) of the electrophoresis tank 101. pHs were measured for the obtained fractions.

Figure 7:
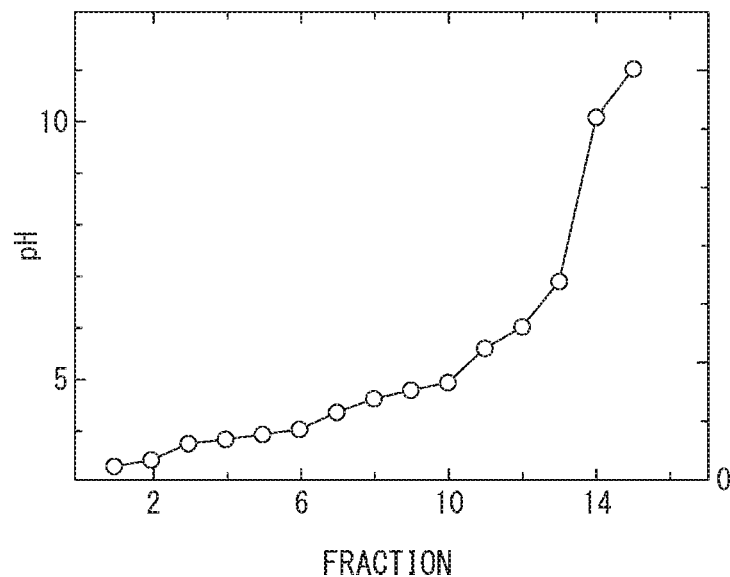
FIG. 7 is a graph showing the pH distribution of samples after separation.

FIG. 7 is a graph showing the pH distribution of samples after separation. In FIG. 6, a horizontal axis is a fraction and a vertical axis is pH.

As shown in FIG. 7, an increase in pH from acidity to alkalinity was confirmed from fraction #1 to fraction #15. In fractions #1 to #9 on the positive electrode side (the lower part) of the electrophoresis tank 101, the pHs thereof were 5 or less and fractions #1 to #9 indicated acidity. The pHs of fractions #11 to #13 were 6 to 7. The pHs of fractions #14 and #15 on the negative electrode side (the upper part) of the electrophoresis tank 101 were 10 to 11 and fractions #14 and #15 indicated alkalinity.

The results of having investigated the separation tendency of the semiconducting type and the metallic type in each separation sample using microscopic Raman spectroscopy and spectrophotometric analysis will be described below.

Figure 8:
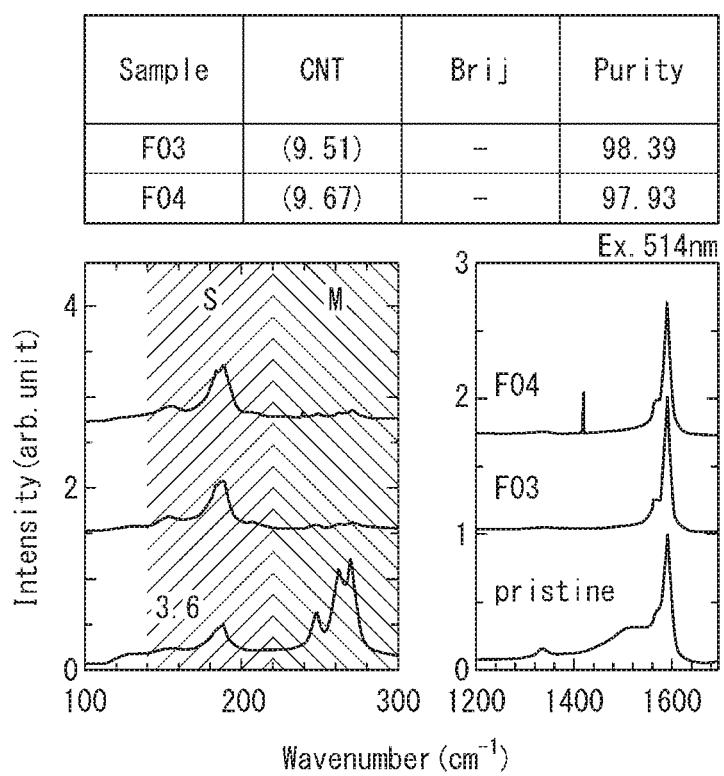
FIG. 8 is a graph showing Raman spectra of samples before and after separation.

FIG. 8 is a graph showing Raman spectra of samples before and after separation. The graph on the left side in FIG. 8 shows the result in a wave number range of 100 to 300 cm$^{-1}$ and the graph on the right side shows the result in a wave number range 1200 to 1680 cm$^{-1}$. As excitation light, 514 nm was used.

A Raman spectrum of a RBM region is a mode in which a diameter of a nanotube oscillates and appears in a low wave number region of 100 to 300 cm$^{-1}$.

The Raman spectrum of a G-band is observed around 1590 cm$^{-1}$ and is a spectrum which appears commonly with respect to graphite materials. In the case of graphite, the Raman spectrum of a G-band is observed around 1585 cm$^{-1}$, and in the case of a carbon nanotube, a G-band splits into two and splits into G+ and G−. Thus, if a G-band appears to have two peaks, it can be determined that there is a nanotube. Furthermore, in the case of metallic nanotubes, the number of oscillations of G− is largely deviated from 1550 cm$^{-1}$ as compared with semiconducting nanotubes.

The Raman spectrum of a D-band is observed around 1350 cm$^{-1}$ and is a spectrum attributed to a defect.

Therefore, the Raman spectrum of a radial breathing mode (RBM) region can be read from the graph on the left side in FIG. 7 and the Raman spectrum of the G-band and the Raman spectrum of the D-band can be read from the graph on the right side in FIG. 7.

In FIG. 8, reference symbol pristine denotes a Raman spectrum before separation and reference symbol F03 (fraction #3) and reference symbol F04 (fraction #4) denote Raman spectra after the separation on the positive electrode side (F03 and F04).

Also, in FIG. 8, reference symbol S denotes a region in which an absorption peak derived from a semiconducting single-walled carbon nanotube is observed and reference symbol M denotes a region in which an absorption peak derived from a metallic single-walled carbon nanotube is observed.

From FIG. 8, in the example in which the liquids are injected into the electrophoresis tank 101 and laminated so that the pH of the liquids increase from the bottom to the top thereof in a direction of gravitational force, a strong peak was observed in a region of reference symbol S on the positive electrode side (F03 and F04). From these results, it was confirmed that the purity of the separation of the semiconducting single-walled carbon nanotube increases on the positive electrode side (F03 and F04). As shown in the table arranged on the upper side of the graph in FIG. 8, the purities were 98.39% (F03) and 97.93% (F04).

Figure 9:
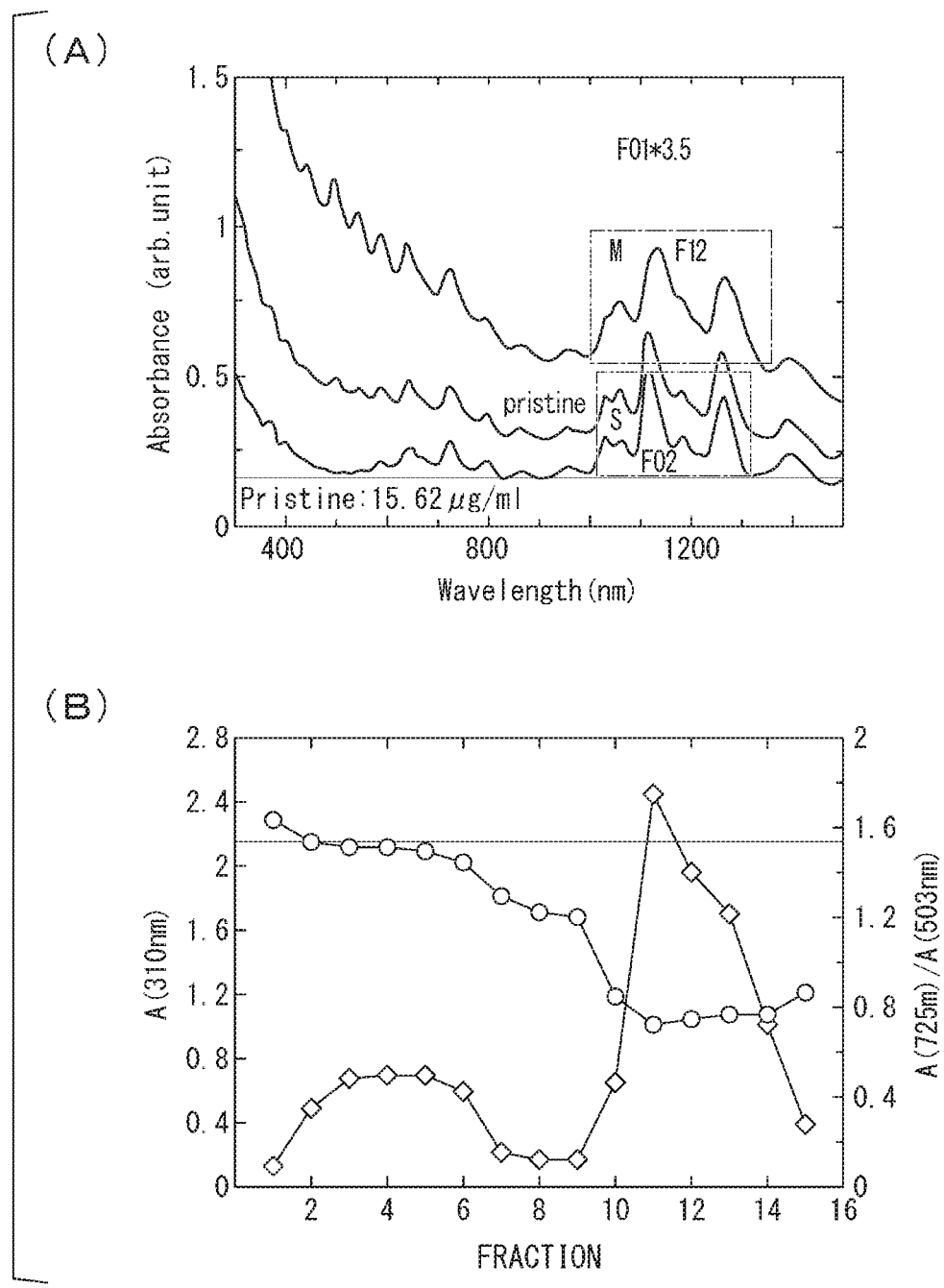
FIG. 9 is a graph showing the absorbance of samples before and after separation.

FIG. 9 is a graph showing the absorbance of samples before and after separation.

In the graph of (A) of FIG. 9, a horizontal axis is a wavelength and a vertical axis is the absorbance. In the graph of (A) of FIG. 9, three absorbances, that is, the absorbance before separation (pristine) and the absorbances after the separation (fraction #2: F02 and fraction #12: F12) are listed. The absorbances of F02, pristine, F12 are listed in order from the bottom. The following points are clear from the graph of (A) of FIG. 9.

In the absorbance spectrum of the sample F02 after separation, an absorption peak derived from a semiconducting single-walled carbon nanotube is observed in a region S surrounded by a quadrangular box using an alternate long and short dash line.

In the absorbance spectrum of the sample F12 after separation, an absorption peak derived from a metallic single-walled carbon nanotube is observed in a region M surround by a quadrangular box using an alternate long and short dash line.

From the above results, it can be understood that, in fraction #12 located on the negative electrode side (metal), an absorption peak derived from a metallic single-walled carbon nanotube is high, and in fraction #2 located on the positive electrode side (semicon), an absorption peak derived from a semiconducting single-walled carbon nanotube is high.

The graph shown in (B) of FIG. 9 shows the absorbances at the time of 310 nm, 503 nm, and 725 nm excitation in the fractions (#1 to #15). A diamond symbol indicates the absorbance at the time of 310 nm excitation and a circular symbol indicates a numeral value obtained by dividing the absorbance at the time of 725 nm excitation by the absorbance at the time of 503 nm excitation.

It is acknowledged that each of peaks of the absorbances at the time of 310 nm excitation in fractions #1, . . . , and #15 is in fractions #2 to #6 (semiconducting single-walled carbon nanotubes) and fractions #10 to #15 (metallic single-walled carbon nanotubes). Thus, it could be confirmed that the purity of the separation increases.

Figure 10:
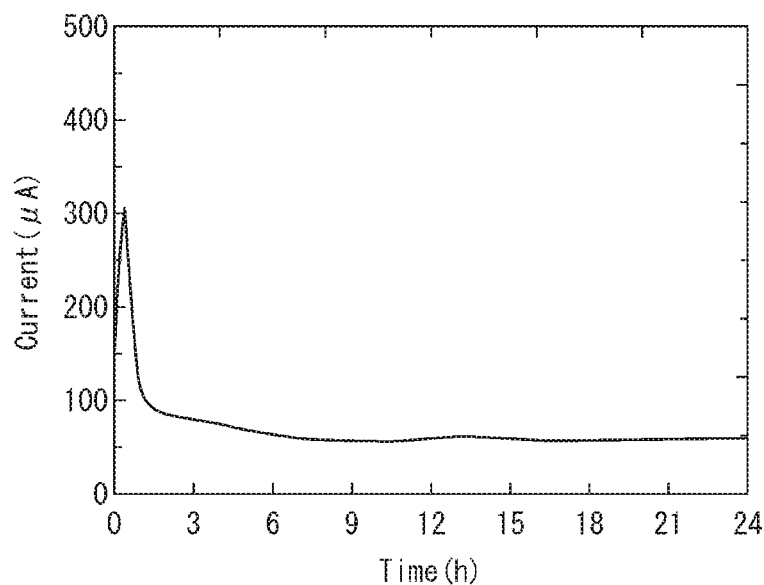
FIG. 10 is a graph showing a change in electrophoretic current during a separation operation.

FIG. 10 is a graph showing a change in electrophoretic current during a separation operation. From FIG. 10, it can be seen that, in the embodiment, an electrophoretic current steadily and gradually decreases with the passage of time. From this, it is inferred that the separation proceeds in the electrophoresis tank 101 in a state in which the convection is minimized.

Figure 11:
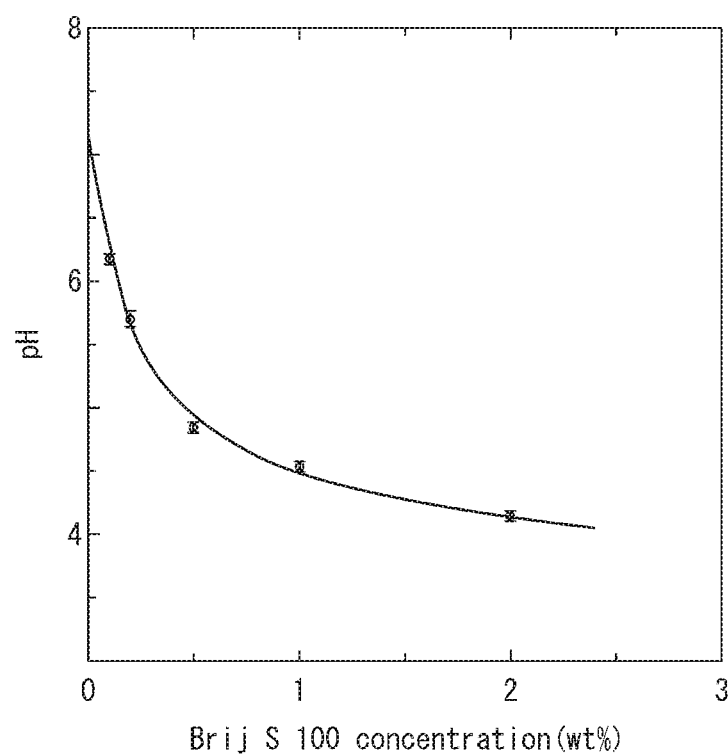
FIG. 11 is a graph showing a relationship between the concentration of a surfactant in a solution and the pH of the solution.

FIG. 11 is a graph showing a relationship between the concentration of a surfactant in a solution and the pH of the solution. FIG. 11 shows the pH of a dispersion liquid which can be controlled by changing a concentration of a surfactant.

In the present invention, dispersion liquids having different pHs are introduced into the electrophoresis tank 101 so that the dispersion liquid has a small pH to a large pH from the bottom to the top of the electrophoresis tank 101. Thus, according to the present invention, it has been confirmed that semiconducting single-walled carbon nanotubes having a purity of 90% or more using the above-mentioned evaluation method can be purified while the separation speeds of the semiconducting and metallic types are improved.

REFERENCE SYMBOLS 1, 1A Separation apparatus
100 Separation apparatus
101 Electrophoresis tank
102, 103 Electrode
10, 10A electrophoresis tank
20, 30 electrode
40 Injection port
50, 60 Extraction port

What is claimed is:
1. A nanocarbon separation method comprising:
preparing a plurality of dispersion liquids having different pHs, at least one of the plurality of dispersion liquids having nanocarbons dispersed therein;
injecting the plurality of dispersion liquids into an electrophoresis tank so that the pHs increase from a bottom to a top in a direction of gravitational force; and
applying a direct-current voltage to electrodes disposed in an upper part and a lower part of the electrophoresis tank.

2. The nanocarbon separation method according to claim 1, wherein the plurality of dispersion liquids contains heavy water and light water.

3. The nanocarbon separation method according to claim 1, wherein a positive electrode is disposed in the lower part of the electrophoresis tank and a negative electrode is disposed in the upper part of the electrophoresis tank.

4. The nanocarbon separation method according to claim 1, wherein the electrophoresis tank has an I-shaped structure.

5. The nanocarbon separation method according to claim 1, wherein the nanocarbons are carbon nanotubes.

6. The nanocarbon separation method according to claim 1, wherein the plurality of dispersion liquids contains an additive other than the nanocarbons.

7. The nanocarbon separation method according to claim 6, further comprising:
preparing the plurality of dispersion liquids including a first liquid and a second liquid, a concentration of an additive in the second liquid being higher than a concentration of the additive in the first liquid.

8. The nanocarbon separation method according to claim 6, wherein the additive is a non-ionic surfactant.

9. A nanocarbon separation method comprising:
injecting a dispersion liquid having nanocarbons dispersed therein into an electrophoresis tank;
injecting a liquid having a pH higher than a pH of the dispersion liquid into the electrophoresis tank after injecting the dispersion liquid; and
applying a direct-current voltage to electrodes disposed in an upper part and a lower part of the electrophoresis tank,
wherein the liquid having the pH higher than the pH of the dispersion liquid is a dispersion liquid having the nanocarbons dispersed therein.

10. The nanocarbon separation method according to claim 9, wherein the electrophoresis tank has a U-shaped structure.

11. A carbon nanotube purification method comprising:
preparing a plurality of dispersion liquids having different pHs, at least one of the plurality of dispersion liquids having carbon nanotubes dispersed therein;
injecting the plurality of dispersion liquids into an electrophoresis tank so that the pHs increase from a bottom to a top in a direction of gravitational force;
applying a direct-current voltage to electrodes disposed in an upper part and a lower part of the electrophoresis tank and separating the carbon nanotubes into metallic nanotubes and semiconducting nanotubes; and
recovering the separated semiconducting nanotubes.

\* \* \* \* \*